United States Patent [19]
Carangelo et al.

[11] Patent Number: 5,473,429
[45] Date of Patent: Dec. 5, 1995

[54] METHOD AND APPARATUS FOR CONTROLLING THE RECIPROCATING TRANSLATION OF AN INTERFEROMETER REFLECTOR OR OTHER BODY

[75] Inventors: Robert M. Carangelo, Glastonbury; Paul C. Jette, Bethel, both of Conn.

[73] Assignee: On-Line Technologies, Inc., East Hartford, Conn.

[21] Appl. No.: 201,691

[22] Filed: Feb. 25, 1994

[51] Int. Cl.$^6$ .................................................. G01B 9/02
[52] U.S. Cl. .................................. 356/345; 356/346
[58] Field of Search ........................... 356/345, 346; 359/871–872

[56] References Cited

U.S. PATENT DOCUMENTS 4,413,908  11/1983  Abrams et al. ..................... 356/346
5,164,788  11/1992  Yoshikawa ......................... 356/346

Primary Examiner—Samuel A. Turner
Assistant Examiner—Jason D. Eisenberg
Attorney, Agent, or Firm—Ira S. Dorman

[57] ABSTRACT

The method and apparatus effect reversal of a body moving at constant velocity, such as an interferometer reflector, by applying a retrograde electromagnetic force that varies in direct proportion to the distance the body has travelled past the point at which turn around is commenced. Circuitry employed is switched between proportional and integral control configurations, the latter permitting sine-wave oscillation to occur in a servo control loop during reversal.

7 Claims, 2 Drawing Sheets

5,473,429

METHOD AND APPARATUS FOR CONTROLLING THE RECIPROCATING TRANSLATION OF AN INTERFEROMETER REFLECTOR OR OTHER BODY

The United States Government has rights in this invention pursuant to Contract No. DASG 60-93-C-0027, awarded by the Department of Defense.

BACKGROUND OF THE INVENTION

A substantial portion of the translation cycle of the moving reflector(s) in a Michelson interferometer is required for direction reversal. Reflector turn around is conventionally effected simply by abruptly applying a strong reverse current to the drive motor; this technique results however in unnecessary travel and makes resumption of the correct, constant speed difficult to achieve. Since scanning cannot be carried out during the period of reflector reversal, the motion and time that are lost in that phase of the cycle represent primary limitations upon interferometer speed, and hence upon the performance of any instrument that incorporates the interferometer.

SUMMARY OF THE INVENTION

Thus, the primary objects of the present invention are to provide an electronic and electromagnetic method for effecting reversal of the direction of movement of a body in a minimal period of time and in a very smooth and efficient manner, and to provide apparatus embodying and implementing the same.

More specific objects of the invention are to provide such a method and apparatus in which the moving body supports a reflective element, especially in an interferometer, wherein the force-generating apparatus is an electrical circuit, and wherein the method and apparatus are relatively incomplex and facile to implement, employ, and manufacture.

It has now been found that certain of the foregoing and related objects of the invention are attained by the provision of a method for controlling the reciprocating translation of a body along a travel path having opposite ends. In accordance with the method, a first electromagnetic force is applied so as to effect movement of the body, at constant velocity, between points adjacent to, and short of, the opposite ends of the travel path, and a second electromagnetic force, consisting of a static holding component and a retrograde component, is applied for a period of time commencing when the body reaches each of those points. The holding component of the second force has a magnitude that would be just sufficient to maintain the body in equilibrium at the certain point, if the body were then static (which magnitude is inclusive of zero when there is no biasing or offsetting gravitational force acting on the body). The retrograde component has a magnitude that varies in direct proportion to the distance the body lies beyond the certain point (toward the adjacent end of the travel path); it increases constantly from substantially zero at the beginning of the turn-around period to a maximum value when the body is at the end of the travel path, and then decreases constantly to substantially zero at the end of the period.

The body will usually be constantly biased toward a central position, intermediate the opposite ends of the travel path, by a force that varies in magnitude proportionately with displacement of the body from the central position. In those instances the static holding component will serve to balance the biasing force, and the first force will vary proportionately with displacement of the body from its central position. The magnitude of the electrical current applied to produce the retrograde force component will most desirably vary as a half-sine wave function.

Other objects of the invention are attained by the provision of apparatus for controlling the reciprocating translation of a body, which apparatus comprises electromagnetic force-applying means and electronic control means. The force-applying means is adapted for applying a first force having a magnitude that can be varied for moving the body, at constant velocity, in first and second opposite directions along a travel path, and for applying, at a certain point along the travel path in each direction, a second force to effect reversal of the direction of movement, as hereinabove described. The control means is adapted for controlling the means for applying so as to alternatively apply, at the certain point, either the first or the second force.

The electrical circuit "means for applying" may, more specifically, include summing means with an input line having two legs connected in parallel and adapted to receive, respectively, a desired motor-velocity signal and an actual motor-velocity signal, the desired-velocity signal-receiving leg having a first disconnect element therein. A feedback loop is connected in the input line of the summing means, and includes series-connected resistance and capacitance components, as well as a second disconnect element for effectively removing the resistance component. Stability is imparted to the circuit with the resistance component included in the feedback loop, and sine wave oscillation occurs in the circuit with the resistance component effectively removed, thus naturally imparting a half-sine wave character to the varying force applied. The control means is operable to simultaneously operate the two disconnect elements, so as to apply a desired motor-velocity signal to the summing means when, and only when, the resistance component is effectively included in the feedback loop.

In more specific embodiments of the electrical circuit, the "means for applying" will comprise sensing means, electrical signal summing means, and feedback means. The sensing means will serve to sense actual velocity and to generate a representative electrical signal; the summing means will be constructed to receive and combine signals from the sensing means and from a generator for producing a desired-velocity signal, and to generate an error signal representative of the difference between the actual-velocity signal and any desired-velocity signal that is input to the summing means. The feedback means will serve to generate, and to impress upon the error signal, a stability mode signal which is, alternatively, either (1) a signal that is an integral function of the error signal or (2) a signal that is, at least dominantly under the conditions of operation, a proportionate function of the error signal. The control means will be operable to selectively impress upon the error signal one or the other of the stability mode signals [i.e., (1) or (2)], and to cause a desired-velocity signal to be input to the summing means when, and only when, the proportionate function signal (2) is so impressed.

Additional objects of the invention are attained by the provision of an interferometer, especially a Michelson interferometer suited for use in a Fourier transform infrared spectrometer. The interferometer will comprise, in combination, a reflective element, a body supporting the reflective element for reciprocating translation along a substantially rectilinear travel path, drive means for driving the body along such a travel path, and apparatus for controlling the translation of the body, as herein described.

DETAILED DESCRIPTION OF THE ILLUSTRATED EMBODIMENTS

Figure 1:
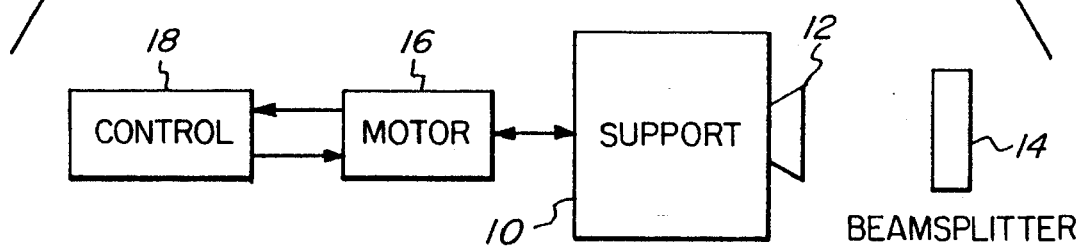
FIG. 1 is a block diagram showing an interferometer system embodying the present invention.

Turning initially to FIG. 1 of the drawings, therein diagrammatically illustrated is an interferometer system embodying the present invention, and including a support 10 for mounting a retroreflector 12 for reciprocal movement along a rectilinear travel path. As will be appreciated by those skilled in the art, the retroreflector 12 cooperates with a beamsplitter 14 to produce an interferogram (using appropriate detectors, electronic data-processing means, transfer optics, etc.) from radiation directed through the beamsplitter upon the retroreflector. A drive motor 16 (which may be of the voice-coil type. and biased to a central position on the travel path) effects reciprocating translation of the support 10; the control apparatus 18 controls the motor 16 so as to reciprocate the support 10 and impart the desired turn-around motion.

Figure 2:
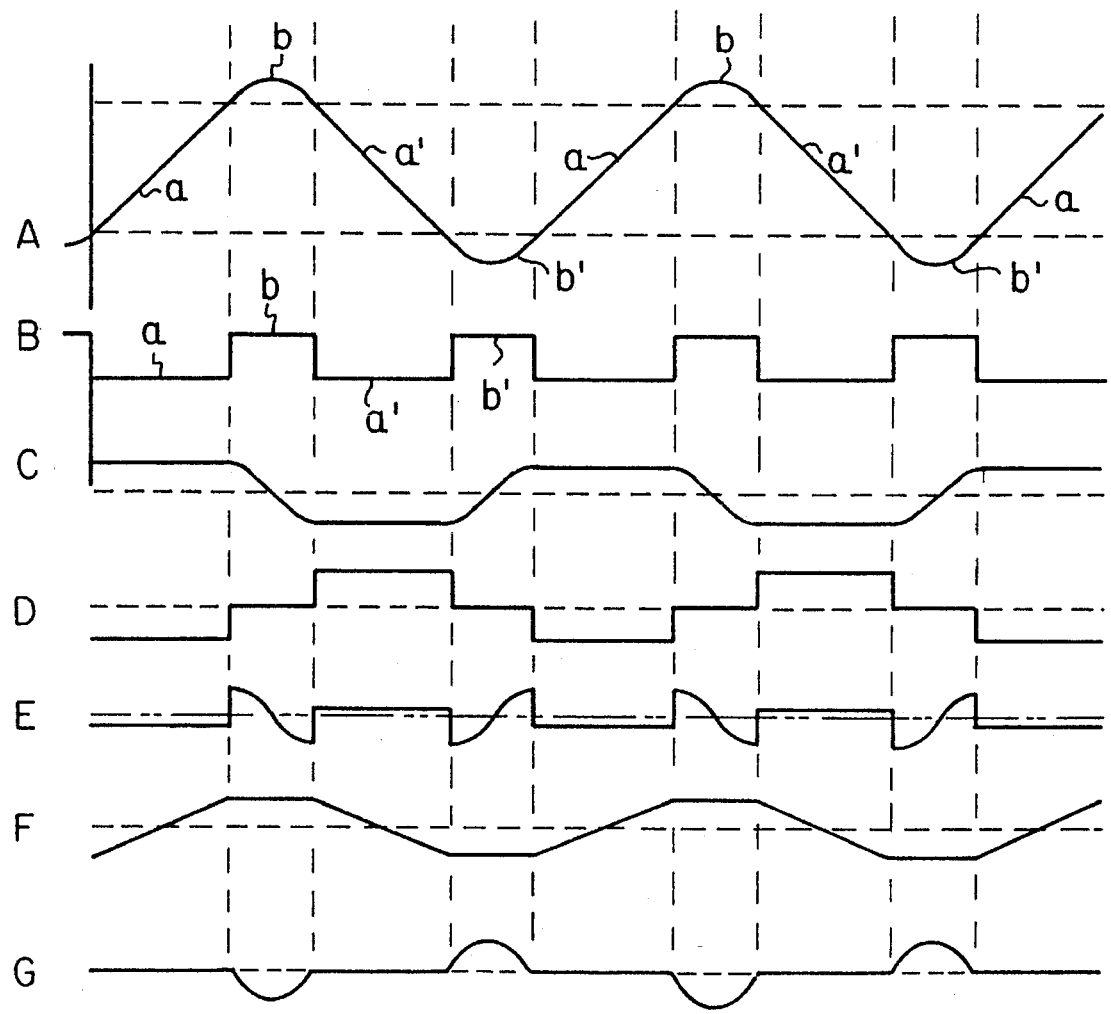
FIG. 2 constitutes a series of curves, A through G, shown in proper phase relationship to one another and graphically depicting features of the instant controlling method, and of the movement of the body;subject to such control.

That motion is graphically illustrated in curve A of FIG. 2 of the drawings, which depicts the actual position of the support 10 and retroreflector 12 plotted as a function of time. The curve consists of rectilinear elements in forward and reverse directions, a and a', respectively, and turn-around or direction-reversal elements b, b', at each end of the travel path; as will be noted, each turn-around element or bump, b, b', has a half-sine wave contour.

The square curve of FIG. 2B graphically illustrates apportionment of the translation cycle between rectilinear movement and turn-around time; i.e., the periods during which the "first" and "second" forces, respectively, are effectively applied to the support 10. Curve C depicts the actual velocity of the support 10 during translation; it moves at constant velocity between the turn-around points and with variable velocity during directional changes. The velocity request necessary to produce the desired velocity (using control circuitry of the nature shown in FIG. 3 and hereinafter described) is depicted in curve D, and the error therebetween is shown in curve E.

Curve F shows the requested force that is required to overcome the force of the biasing component by which the support 10 is urged toward its central position. As can be seen, in producing the rectilinear, constant-velocity position change the requested force constitutes the "first" force, and increases from a negative maximum, through zero and to a positive maximum. Force (constituting the static holding component of the "second" force) is maintained during turn around at the maximum level attained by the "first" force, so as to exactly balance the centralizing biasing force during those phases of the cycle.

Finally, curve G depicts the retrograde component of the "second" force, which is superimposed so as to effect turn around in accordance with the instant invention. It varies in direct proportion to the distance the body has moved past the point of turn-around commencement, increasing continuously from substantially zero to a maximum value in a negative sense (i.e., in the direction opposite to the force applied during approach to the turn-around point), and then decreasing constantly to substantially zero when the support 10 has again reached the turn-around starting point. Because the requested force is maintained constant during direction reversal, and the turn-around force has become zero at the end of the period, the translating body is subjected to precisely the correct forces for causing it to resume constant-velocity movement when turn around is complete; i.e., no velocity correction is required.

Figure 3A:
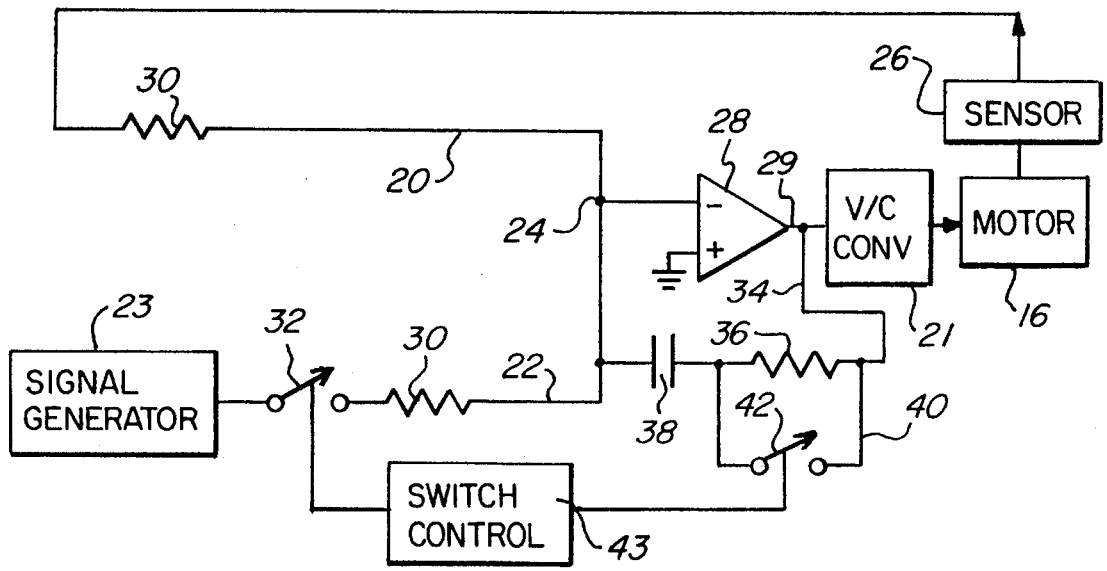
FIGS. 3A, 3B and 3C depict, respectively, a control circuit embodying the present invention and the two alternative configurations thereof.
Figure 3B:
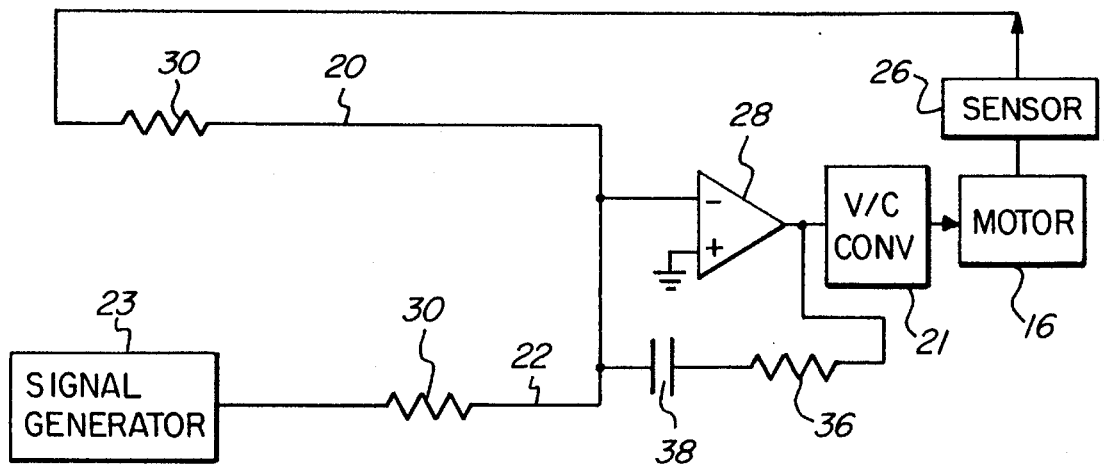
Figure 3C:
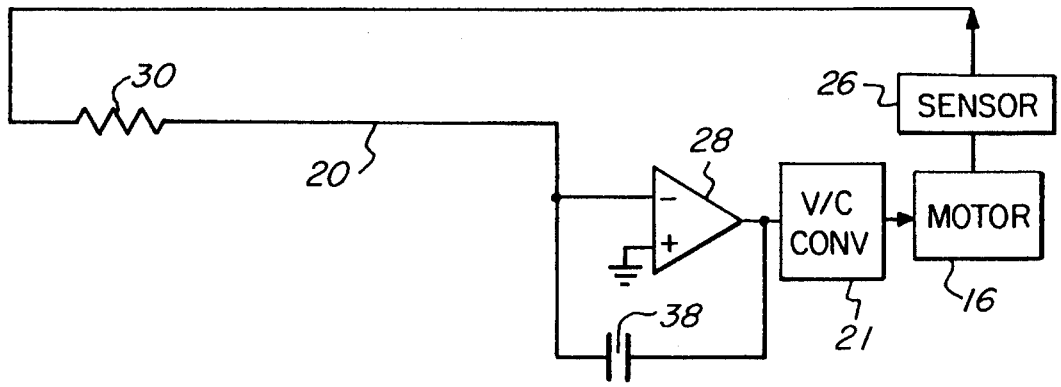

Turning now to FIG. 3, therein illustrated is a circuit suitable as the control 18 of the system of FIG. 1, FIGS. 3B and 3C merely showing the two alternative configurations of the circuit of FIG. 3A. The circuit controls the current delivered to the motor 16 by means of the voltage-to-current converter (V/C CONV.) 21, so as to produce the force necessary to achieve the changes in velocity required during the constant-velocity (scanning) and turn-around phases of the cycle of translation of the support and reflector 10, 12.

As can be seen, the circuit includes two input signal paths 20, 22, connected at the juncture 24, which is in turn connected to the negative terminal of an Op-Amp 28; each signal path 20, 22 contains a resistor 30, the values of which resistors will normally be equal. A signal representing the actual velocity of the motor (graphically shown in curve 2C) is generated by velocity sensing means 26, and is input to the signal path 20.

Signal path 22 includes a switch 32, and is connected to a signal generator 23 for producing a requested velocity signal (in accordance with curve 2D). A feedback loop 34 connects line 29 from the Op-Amp 28 effectively to the juncture 24, and contains a resistance component 36 and a capacitance component 38; line 40 and switch 42 constitute a shorting circuit for effectively removing the resistance component 36 from the feedback loop. The switches 32 and 42 are operated by a switch control 43, the functioning of which depends upon position sensors (not shown), which may be integral with the motor 16 or installed elsewhere in the system.

FIG. 3B shows the proportional-control configuration of the circuit, in which the switch 32 is closed and the switch 42 is open. The Op-Amp 28 receives both the motor-generated actual-velocity signal along input signal path 20 and also the requested-velocity signal from the generator 23. It will be noted that the feedback loop includes the capacitance component 38 as well as the resistance component 36; at the frequencies of operation, however, the resistance component 36 is dominant. Consequently, the resultant proportional control produces a highly stable condition, causing to be delivered to the motor 16 the appropriate amount of current necessary to move the support 10 at the demanded constant speed, and thus causing translation to occur in conformity with elements a, a' of curve 2A.

Operation of the switch-operating means 43, so as to open switch 32 and close switch 42, produces the integral-control circuit configuration depicted in FIG. 3C, employed to effect turn around of the support and reflector 10, 12. Excluding the resistance component 36, and thereby subjecting the Op-Amp to only the capacitance effects in its feedback loop, renders the circuit unstable and naturally subject to sine-wave oscillation; current to the motor 16 is therefore caused to vary as a half-sine wave function, producing the bump forces depicted in curve 2G and the position-representing elements b, b' of curve 2A.

It will be appreciated by those skilled in the art that an impressed force, varying as a half-sine wave function, enables direction reversal to be achieved with maximum efficiency and smoothness, and in a minimal period of time. Although the actual turn-around times attainable will depend upon many factors, including the weight of parts, ratings of electrical components used, etc., the illustrated circuit is capable of smoothly and continuously effecting reversal of the direction of a moving body in a period as brief as one millisecond. As a practical matter, however, turn around in an interferometer will generally require about 5 to 10 milliseconds, which may be compared with times on the order of 100 milliseconds, typically required in presently available conventional systems. It will also be appreciated that other means, such as electronic dataprocessing apparatus, may be employed to generate and apply the wave form necessary to effect turn around of a translating body in accordance with the instant invention, and that the concepts hereof may be applied with comparable advantage to systems other than interferometers. Indeed, and although no translating body is involved, the turn-around control technique described is believed to have application in the reduction of high-frequency noise caused by reversal of the direction of a flowing current, as in a switching power supply.

It should perhaps be emphasized that the translating body may or may not be acted upon by centralizing (or other) forces resisting movement toward the turn-around points. This of course influences not only the magnitude of the force that is "necessary" to effect movement of the body, and the timing of application thereof, but also whether or not the holding force component need have any magnitude to be "sufficient" for maintaining the body at those points.

Thus, it can be seen that the present invention provides a method, and apparatus embodying and implementing the same, in which electronic computation and control, and electromagnetic forces, are employed for effecting reversal of the direction of movement of a body in a minimum period of time and in a very smooth and efficient manner. The instant method and apparatus are more specifically applicable to the moving reflective element of an interferometer, using electrical circuitry to control power for translation; implementation, use, and manufacture are relatively incomplex and facile.

Having thus described the invention, what is claimed is:

1. In a method for controlling the reciprocating translation of a body along a travel path having opposite ends, the steps comprising:

applying a first electromagnetic force of such magnitude as is necessary to effect movement of said body along said travel path, at constant velocity, between points adjacent to, and short of, said opposite ends of said travel path; and applying a second electromagnetic force for a period of time commencing when said body reaches each of said points, said second force consisting of a static holding component and a retrograde component, said holding component having a magnitude that would be just sufficient to maintain said body at said point if said body were static, and said retrograde component being so directed as to effect reversal of said body and having a magnitude that varies in direct proportion to the distance said body lies beyond said point, said magnitude of said retrograde component increasing constantly from substantially zero at the beginning of said period to attain a maximum value when said body is at the adjacent end of said travel path, and then decreasing constantly to substantially zero at the end of said period of time.

2. The method of claim 1 wherein said body is constantly biased toward a central position intermediate said opposite ends by a biasing force having a magnitude that varies proportionately with displacement of said body from said central position, and wherein said magnitude of said first force varies proportionately with displacement of said body from said central position and said magnitude of said holding component balances said biasing force with said body at said point.

3. The method of claim 1 wherein the magnitudes of said first and second forces are functions of applied electrical current, the current applied to produce said retrograde force component varying as a half-sine wave function.

4. Apparatus for controlling the reciprocating translation of a body, comprising;

means for applying a first electromagnetic force having a magnitude that can be varied as necessary for moving a body at constant velocity in first and second opposite directions along a travel path, and for applying, at a certain point along said travel path in each of said directions, a second force to effect reversal of the direction of movement of the body, said second force consisting of a static holding component and a retrograde component, said holding component having a magnitude that would be just sufficient to maintain said body at said point if said body were static, and said retrograde component increasing constantly from substantially zero to a maximum value, and thereafter decreasing constantly to substantially zero; and electronic control means for controlling said means for applying to alternatively apply, at said certain point, either said first or second force.

5. The apparatus of claim 4 wherein said apparatus comprises an electrical circuit, said means for applying including summing means with an input line having two legs connected in parallel and adapted to receive, respectively, a desired motorvelocity signal and an actual motor-velocity signal, said leg adapted to receive a desired-velocity signal having a first disconnect element therein, said summing means also having a feedback loop connected to said input line and including, in series, a resistance component and a capacitance component, said feedback loop further including a second disconnect element for effectively removing said resistance component therefrom, said feedback loop imparting stability to said circuit with said resistance component included and permitting sinewave oscillation in said circuit with said resistance component effectively removed; said control means being operable to simultaneously operate said disconnect elements at said certain point so as to apply a desired motor-velocity signal to said summing means when, and only when, said resistance component is effectively included in said feedback loop.

6. The apparatus of claim 4 wherein said apparatus comprises an electrical circuit, said means for applying including: (a) sensing means for sensing actual velocity and for generating an electrical signal representative thereof; (b) summing means for summing electrical signals, said summing means being constructed and connected to receive and combine signals from said sensing means and from a generator for producing a desired-velocity signal, and to generate an error signal representative of the difference between an actual-velocity signal and any desired-velocity signal input to said summing means; and (c) feedback means for generating and impressing upon the error signal a stability mode signal which is alternatively either (1) a signal that is an integral function of the error signal or (2) a signal that is, at least dominantly under the condition of operation, a proportionate function of the error signal; said control means being operable to selectively impress upon the error signal one or the other of the stability mode signals, (1) and (2), and to cause a desired-velocity signal to be input to said summing means when, and only when, the proportionate function signal (2) is so impressed.

7. In an interferometer, the combination comprising:

(a) a reflective element;

(b) a body supporting said reflective element for reciprocating translation along a substantially rectilinear travel path;

(c) drive means for driving said body along said travel path; and (d) apparatus for controlling the translation of said body, said apparatus comprising:

means for applying a first electromagnetic force having a magnitude that can be varied as necessary for moving a body at constant velocity in first and second opposite directions along a travel path, and for applying, at a certain point along said travel path in each of said directions, a second electromagnetic force to effect reversal of the direction of movement of the body, said second force consisting of a static holding component and a retrograde component, said holding component having a magnitude that would be just sufficient to maintain said body at said point if said body were static, and said retrograde component increasing constantly from substantially zero to a maximum value, and thereafter decreasing constantly to substantially zero; and electronic control means for controlling said means for applying to alternatively apply, at said certain point, either said first or second force.

* * * * *